(12) United States Patent
Chapman et al.

(10) Patent No.: US 10,886,874 B2
(45) Date of Patent: Jan. 5, 2021

(54) HYBRID MANAGEMENT MODULE

(71) Applicant: SunPower Corporation, San Jose, CA (US)

(72) Inventors: Patrick L. Chapman, Austin, TX (US); John Peurach, San Francisco, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/989,687

(22) Filed: May 25, 2018

(65) Prior Publication Data

US 2018/0351504 A1 Dec. 6, 2018

Related U.S. Application Data

(60) Provisional application No. 62/514,253, filed on Jun. 2, 2017.

(51) Int. Cl.
| | |
|---|---|
| *H02S 40/30* | (2014.01) |
| *H02J 13/00* | (2006.01) |
| *H02S 40/32* | (2014.01) |
| *H02S 40/34* | (2014.01) |
| *G05B 19/048* | (2006.01) |
| *H04L 12/66* | (2006.01) |
| *H02S 50/00* | (2014.01) |
| *H02J 3/38* | (2006.01) |

(52) U.S. Cl.
CPC ............ *H02S 40/30* (2014.12); *G05B 19/048* (2013.01); *H02J 13/0006* (2013.01); *H02S 40/32* (2014.12); *H02S 40/34* (2014.12); *H02S 50/00* (2013.01); *H04L 12/66* (2013.01); *G05B 2219/2639* (2013.01); *H02J 3/383* (2013.01)

(58) Field of Classification Search
CPC .......... H02S 40/30; H02S 40/32; H02S 40/34; H02S 50/00; G05B 19/048; G05B 2219/2639; H02J 13/0006; H02J 3/383; H04L 12/66
USPC ....................................................... 700/295
See application file for complete search history.

(56) References Cited

U.S. PATENT DOCUMENTS

| | | | | |
|---|---|---|---|---|
| 8,634,216 B2 * | 1/2014 | Chapman | .......... | H02M 3/33523 363/71 |
| 10,097,005 B2 * | 10/2018 | Narla | ....................... | H02S 50/00 |
| 2006/0267792 A1 * | 11/2006 | Schnaare | ............... | G08C 17/02 340/870.1 |
| 2011/0172842 A1 * | 7/2011 | Makhota | ........... | H01L 31/02021 700/292 |
| 2013/0249297 A1 * | 9/2013 | Takehara | .................. | H02J 1/00 307/71 |

(Continued)

*Primary Examiner* — Robert E Fennema
*Assistant Examiner* — Christopher W Carter
(74) *Attorney, Agent, or Firm* — Grasso PLLC

(57) ABSTRACT

One or more hybrid management modules for Photovoltaic (PV) systems are provided. These modules may be configured for peer-to-peer communication and may also be configured for cellular communication outside of the PV system. The modules may be coupled or located near individual PV modules and may be configured with or alongside PV inverters or converters. The modules may take the place of a central system manager located beyond a main service panel and may work in conjunction with a controller located beyond a main service panel.

19 Claims, 8 Drawing Sheets

(56) References Cited

U.S. PATENT DOCUMENTS

| | | | |
|---|---|---|---|
| 2014/0149076 A1* | 5/2014 | Jarnason | H02S 50/10 |
| | | | 702/182 |
| 2014/0211529 A1* | 7/2014 | Kandasamy | H02M 7/797 |
| | | | 363/131 |
| 2014/0218010 A1 | 8/2014 | Fulton et al. | |

* cited by examiner

HYBRID MANAGEMENT MODULE

RELATED APPLICATIONS

This application claims priority to U.S. Provisional application 62/514,253, which was filed on Jun. 2, 2017 and is entitled "Hybrid Management Module." The '253 application is incorporated by reference in its entirety into this application.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current. When a PV module comprises a microinverter, the combined device may be identified as a PV AC module because the module is configured to output AC voltage.

A typical PV system can consist of several connected PV AC modules feeding a service panel. This service panel may be connected to one or more loads, such as the electric grid. The service panel may also be connected to a downstream system manger having management responsibilities for the entire PV system as well as serving as a communication gateway for the entire PV system. Connected to the main service panel, the system manager is located after the main service panel and, therefore, apart from the PV AC modules and not directly connected to them. From this location, the system manager can communicate to the remote PV AC modules, through the main service panel and associated bus and breakers, via power line communications (PLC). The system manager is often connected via a wired WAN connection for purposes of enabling communications as the gateway for the PV system.

DETAILED DESCRIPTION

Figure 1:
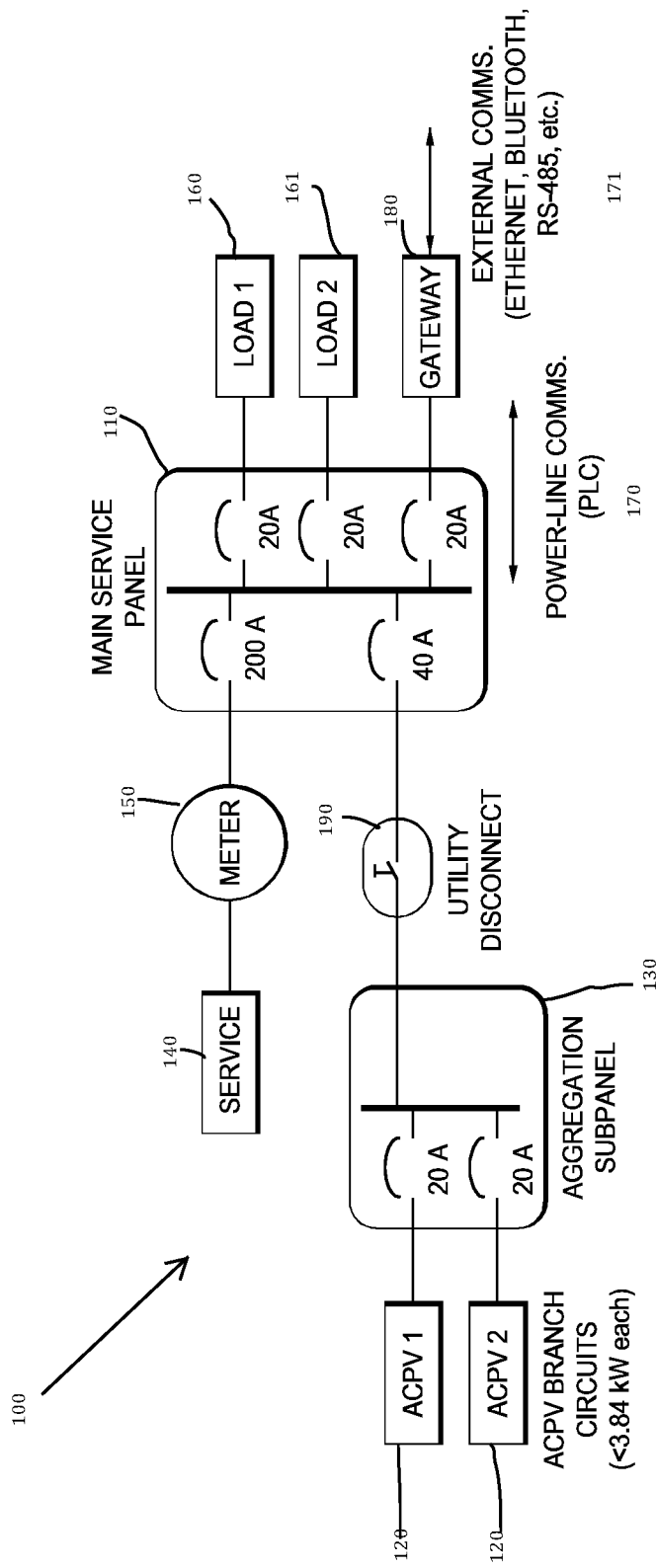
FIG. 1 illustrates PV system components and gateway device that may be replaced or augmented by a hybrid management module, according to some embodiments.

Hybrid management modules (HMMs) for Photovoltaic (PV) systems are provided. These modules may be configured for peer-to-peer communication within a PV system, may be configured for cellular communication among components of a PV system, and may be configured for cellular communication to devices and systems outside of a PV system. One or more HMMs may be coupled or located near individual PV modules and may be configured with or alongside PV inverters or converters. The one or more HMMs may take the place of a central system manager located beyond a main service panel from a PV system and may work in conjunction with a controller located beyond a main service panel from a PV system. HMMs may be coupled to existing PV system component circuitry and may be configured for incorporation into PV system component circuitry.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" hybrid ac module or peer-to-peer module does not necessarily imply that this module is the first hybrid ac module or peer-to-peer module in a sequence; instead the term "first" is used to differentiate this module from another module (e.g., a "second" hybrid ac module or peer-to-peer module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

This specification describes exemplary hybrid management modules that may be employed in PV systems. These hybrid management modules may perform one or more functions of system managers and may be coupled to a PV module or an AC module (i.e., a PV module including a microinverter) or may be placed at other locations as well within and outside of PV systems. In some embodiments an HMM may be introduced into a PV system as a retro-fit component or module. Comparatively, HMMs may also be configured with new microinverter or other PV system component topologies for future designs, e.g., non-retrofit applications.

These hybrid management modules may be employed as peer-to-peer systems, where several hybrid modules are employed and communicate amongst each other in the same PV system, in different PV systems, and to external devices or systems as well. In embodiments, functionality formerly performed by a central gateway device or other system-level manager device located beyond a main service panel of a PV system may be performed by a hybrid management module instead of by the device beyond the main service panel as well as in addition to such a system-level manager device— for purposes of redundancy or back-up.

As noted, hybrid management modules may be configured as peer-to-peer device(s). For example, in embodiments peer-to-peer applications may employ multiple hybrid management modules for a single PV system. In so doing, a hybrid management module may communicate with other hybrid management modules of the same PV system and one or more hybrid management modules may serve as a gateway to communicate outside of and beyond the PV system with external servers or other devices or systems. Various examples are provided throughout this disclosure.

Hybrid management modules may be coupled directly to a PV module or an AC module at the actual field installation location, accordingly, HMMs may be located on a roof or other difficult to access location. The installations may be a retro-fit type installation as well as a new installation. Retrofit installations may involve upgrading an existing and operating PV system with one or more HMMs while removing, deactivating or otherwise supplanting a previous gateway or other management system located beyond a main service panel for the PV system. New installations may employ HMMs before a main service panel instead of or in addition to gateways located after a main service panel servicing the PV system.

HMMs may communicate with each other and with other components using cellular communication technology and protocols. The use of cellular communication protocols, rather than WiFi communication protocols, for HMMs to communicate beyond the PV system may provide management advantages, overhead advantages, communication efficiencies and other advantages. For e.g., a PV system need not rely solely on a communication platform being offered and maintained by the site operator. Instead, using cellular communication protocols, the manufacturer or PV designer or other principle can set and maintain the PV system without ongoing site user or installer dependency for communications. The cellular communication protocols may include any of the following: time division multiple access (TDMA), frequency division multiple access (FDMA), code division multiple access (CDMA), orthogonal frequency division multiple access (OFDMA), Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In embodiments, each HMM may have cellular communication capability. Conversely, in embodiments, less than every HMM may be configured with cellular communication functionality, i.e. some HMMs may not have gateway circuitry and functionality and by being so configured may communicate amongst other HMMs in a PV system but not necessarily beyond the PV system as would be performed by an HMM with a gateway topology or functionality. Communication between HMMs may be maintained between strings of PV modules and between PV modules of the same string. Other wired and wireless communication pathways may also be employed between HMMs.

Embodiments may employ primary and secondary HMMs. Primary HMMs may be in system management gateways and be responsible for communicating outside of the PV system while secondary HMMs may include solely local gateways and may solely communicate and report within the PV system. Embodiments may include multiple primary HMMs. For example, on a pitched roof with multiple gables, a primary HMM may be placed on each gable side in order to increase the likelihood of maintaining cellular signal strength being available for the entire PV system. In other words, primary HMMs may be distributed throughout the PV system such that the strongest available cellular service may be located and used by one or more of the primary HMMs. Thus, by having HMMs face in different directions of a multiple gable or peak roof, one or a few of the HMMs may have access to a stronger cellular signal than other HMMs of the same system and a majority or all of the HMMs of the PV system may communicate amongst themselves and use the HMM with the strongest available signal strength for communication via the cellular protocol.

PV systems in which HMMs may be employed may consist of various components and may include AC modules 120, Invisimount racking/mounting system, and a main service panel 110. The HMMs may be located in the PV system before a service panel 110 shown in FIGS. 1-3. As noted above, the HMMs may communicate with each other and outside of the PV system with cellular communication technology and protocols. The HMMs may also employ other modes of communication, including power line communication (PLC).

PLC communication between a gateway located beyond the main service panel and AC modules can be problematic and is not preferred but can be employed in embodiments. In these nonpreferred applications, the gateway is preferably remotely located from the AC modules beyond the main service panel and, therefore, the PLC communications are more susceptible to interference. This may lead installers to add a filter to the power line to improve the communications. This filter installation can occur after the system has been installed and, therefore, can result in inefficient rework. In embodiments, these PLC concerns may be reduced or eliminated through the use of HMMs located upstream of the main service panel.

Figure 2:
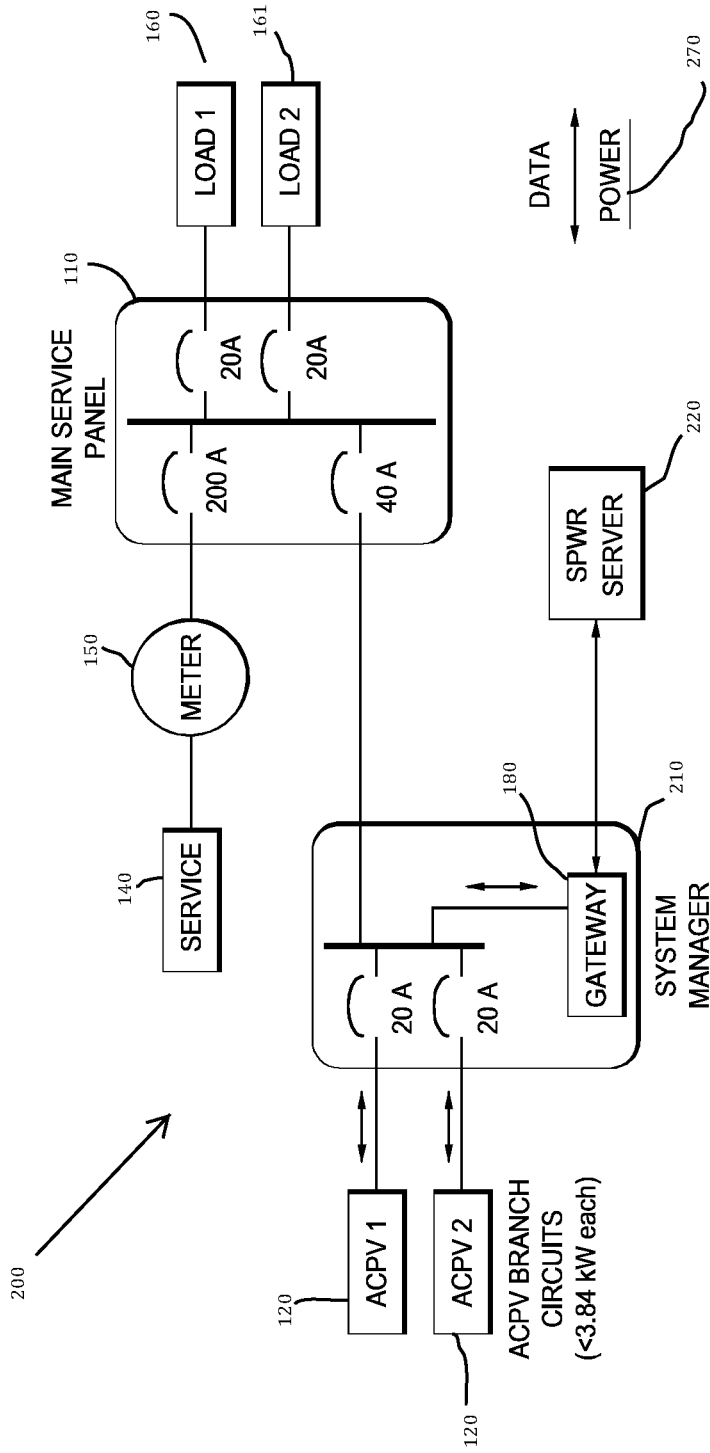
FIG. 2 illustrates PV system components and gateway device that may be replaced or augmented by a hybrid management module, according to some embodiments.
Figure 3:
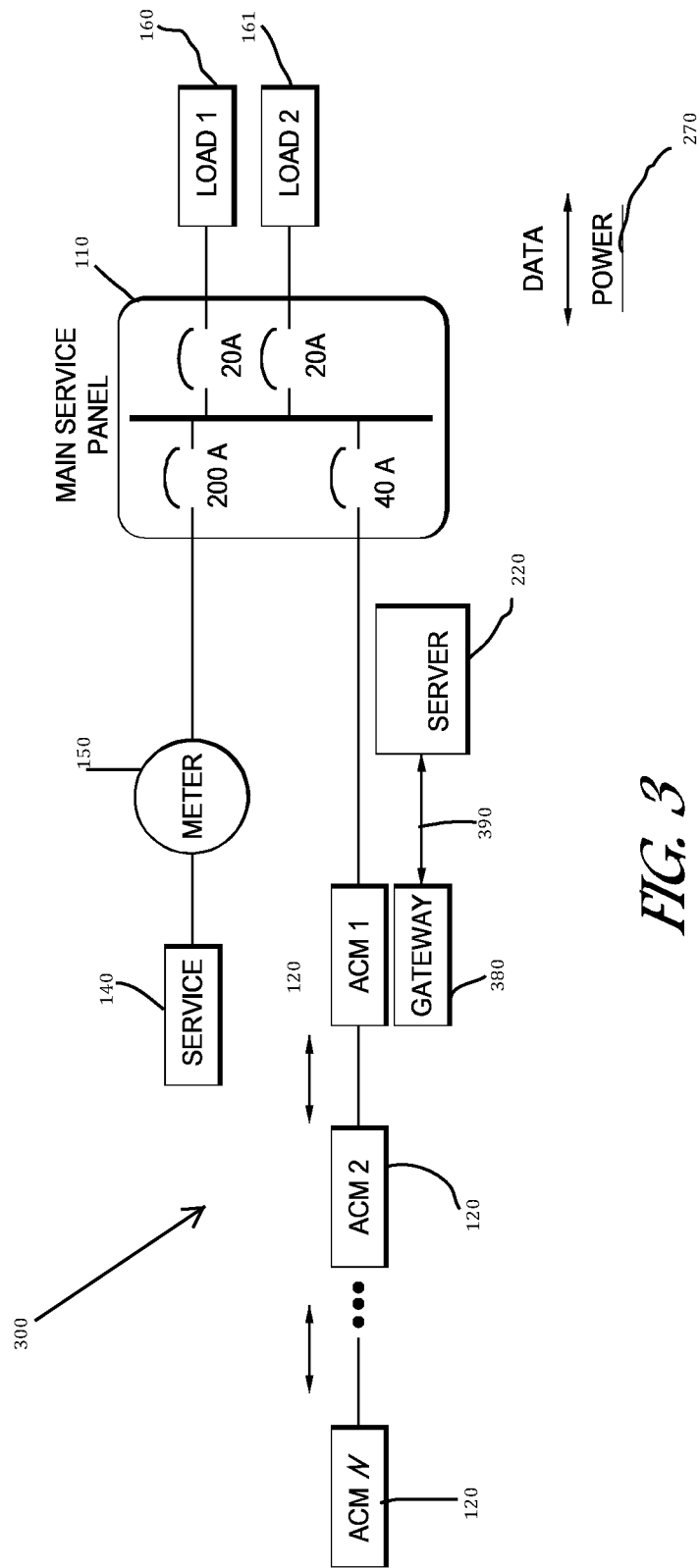
FIG. 3 illustrates PV system components and a hybrid management module, according to some embodiments.

FIG. 1 illustrates a PV system 100 with components and gateway device that may be replaced or augmented by a hybrid management module, according to some embodiments. FIG. 2 illustrates PV system 200 with components and gateway device that may be replaced or augmented by a hybrid management module, according to some embodiments. And FIG. 3 illustrates a PV system 300 with components and a hybrid management module, according to some embodiments. Labelled in these figures are: electrical service 140, electrical meter 150, main service panel 110, load 160, load 161, gateway 180, external communications 171, Power-Line Communications 170, utility disconnect 190, aggregation subpanel 130, ACPV modules 120, system manager 210 with gateway 180, gateway 380, and external management server 220. The flow of data and power are indicated with dual arrows as shown at 270.

As can be seen, FIG. 2 shows that gateway circuitry may be located before the main service panel 110. Placing the gateway here may leave to power line noise and the installation of a filter to reduce the noise. Like in FIG. 1, the gateway installation in FIG. 2 may not be preferred for lack of scalability. In other words, the gateway may be oversized for the communication services provided. Also, the gateway may be burdened by cost in some cases. For example, if a system has only one branch circuit, then the system manager housing the gateway contains more capacity than is required. It is not necessary to aggregate circuits as there is only one circuit. A small system, such as one with only one circuit, would be especially burdened since the cost of the system manager, with gateway, would be spread over fewer installed watts. Similarly, if the system manager, with gateway were sized for three circuits, then a two-circuit system would have some waste due to the unnecessary accommodations in the system manager associated with the third breaker (breaker cost, size, mass, connector overhead, etc.).

Embodiments may provide the gateway functionality shown in FIGS. 1 and 2 where the gateway function may be retrofit into or added onto (preferred) one or more AC module(s) 120 shown therein, ostensibly as a part of or companion to that module's microinverter. In embodiments with just one branch circuit, there may be less or no need for the subpanel 130 (FIG. 1) or the system manager 210 (FIG. 2, gateway plus combiner). Removing either or both can save the cost of equipment and associated installation time in preferred embodiments. Thus, processes of embodiments may include removing or decommissioning gateway 180 and installing HMM functionality at one or more of the ACPVs 120. The HMM functionality may be installed elsewhere in the PV systems 100 and 200 as well. For example, HMM modules may be installed between the ACPVs 120 and a subpanel as well as preferably other locations before a main service panel 110.

FIG. 3 illustrates features as may be employed in embodiments. In this figure, the coupling details of how the retrofit HMM gateway 380 is merged with the AC module are discussed below. ACM 1 is chosen in FIG. 3, but in principal, any of the modules 120 could have been used. It may be preferable to choose one module over another when communication paths are considered. For example, assuming the AC modules communicate using PLC, then it might may be preferred to locate the gateway-enabled AC module, e.g., an HMM, in the center of the branch as it may shorten the distance to the farthest module. Placement of HMMs may also be optimized in other ways for PV system installations. For example, HMMs may be located at the highest point of an installation or at far corners of an installation, in each case to potentially increase cellular communication signal strength. HMMs may also be located in a PV system to minimize communication distances between other components in the PV system.

Embodiments may also employ AC modules with HMMs that communicate their data via short-range wireless transceivers, using a protocol like Zigbee or any of a number of other methods or protocols. When employing short-range wireless transceivers, it may be preferred to position the gateway-enabled module toward the physical center of the array so that no other modules are particularly far from it because wireless signals typically drop quickly in strength based on distance squared or cubed from a source.

Arrow 390 in FIG. 3 shows the communication path from the HMM gateway to the outside world (e.g., a manufacturer management server 220). In preferred embodiments, the HMM gateway may employ only cellular communications, such as the 3G cellular for this communication path. Decreasing cost of data and removal of unnecessary hardware may each be observed in some embodiments while other advantages may also manifest themselves in some embodiments.

The gateway-enabled AC module (i.e., microinverter and HMM) could also use powerline communication to connect to an end user (e.g., homeowner's) router. HomePlug™ or similar standard may be employed for such communications. In such embodiments an added HomePlug chipset may be employed and a receiving unit near the end user router may also be employed. Costs of these additional components and their installation may be offset through inherent efficiencies stemming from avoiding the necessity of gateway placement beyond the main service panel. Further, and perhaps most importantly, using a homeowner's router requires the homeowner to have reliable internet service, a working router, and for the supplier or maintenance company to have access. When a homeowner changes service, changes/resets their router, or does anything that might affect the connection, it can result in loss of data—in which case the gateway would revert to cellular connections. As such, it may be optimal to use only cellular connections and bypass the homeowner's network. Nevertheless, embodiments may employ both communication methodologies between the HMM and external recipients.

As to data collection, in embodiments there may be module-to-module communications where operational data or other data types are exchanged. In embodiments, a gateway-enabled AC module may act as a hub and perform central system manager operations when there is no central system manager with gateway positioned beyond the main service panel from the PV system. Using PLC, short-range wireless, or whatever preferred communication, the HMM may preferably orchestrate the communications among the other peer HMM modules, for instance, conducting commission acts and polling data. This gateway-enabled PV module (PV panel, microinverter, and HMM), then may provide more processing and data handling capability than the PV AC module prior to retrofit. A gateway-enabled PV module may have a more powerful processor, more memory, or other hardware than other modules. A gateway-enabled PV module may, alternatively, have identical hardware but simply more fully-featured firmware. In that case, it would seem the majority of modules carry unnecessary hardware overhead, but for simplicity, this could be a preferred case as it would eliminate the need to source different kinds of modules. The hardware overhead may be quite minimal in context of a microinverter, whose cost is dominated more by cables, chassis, and power electronics.

In embodiments, a gateway-enabled module may collect data from the other modules whether the HMMs are configured as peer-to-peer equivalents or peer-to-peer primary and secondary modules. To send the data to a server outside of the PV system, an HMM could use cellular data as noted above.

In embodiments, a hardware add-on unit may be employed with the designated gateway-enabled module. This add-on unit, e.g., a communication unit, may contain the cellular modem and perhaps some modest digital processing circuitry to augment the processing power of the AC module microinverter. An HMM may preferably also have a connection means, such as a LAN port, to couple it to the AC module, both mechanically and electrically (since it would require both cellular communications and electrical power). In preferred embodiments, HMMs, can couple to the AC module without an electrical connector (it would need a physical/mechanical mount).

Figure 4:
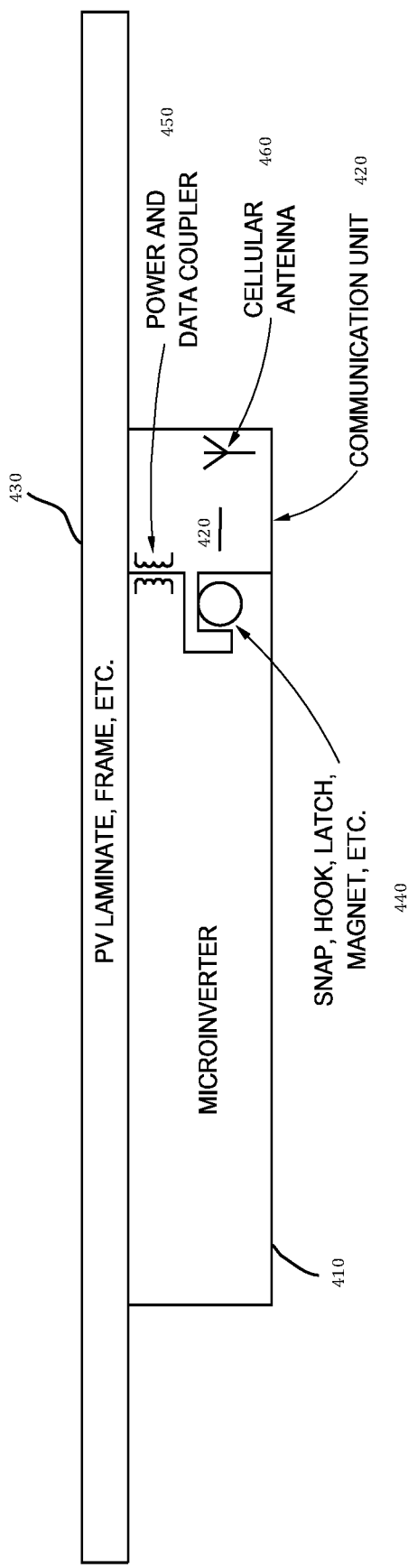
FIG. 4 illustrates a hybrid management module with PV module and microinverter, according to some embodiments.

In FIG. 4, a microinverter 410 with coupled HMM 420 and a PV module 430 are shown. The PV module 430 is shown schematically, and may consist of a laminate, frame, and electrical wiring or junction boxes in embodiments. The microinverter 410 is shown as a simple box, but may contain circuitry, cables, and connectors in embodiments. The module 430 and the microinverter 410 may be connected in a number of ways in embodiments.

The coupling of the HMM to the microinverter is labelled at 440. In embodiments, the microinverter may have a built-in feature (such as an eyelet, clip, or post) that the communication unit may couple to using a compatible feature (such as a hook or snap). Embodiments may also employ permanent magnets such that the HMM 420 and the microinverter 410 can be coupled together. The physical coupling can be done in many other ways, in preferred embodiments, one or more low-cost couplers may be provided with the microinverter and the PV module 430, and a compatible coupler may reside with the HMM such that, in the field, the HMM 420 can be easily coupled (ideally without using a tool) to the microinverter 410 and/or the PV module 430.

Installation processes may also provide, simultaneous with the physical coupling, that electromagnetic coupling is also concurrently accomplished. In FIG. 4, for example, electromagnetic coupling is performed with two coils labelled power and data coupler 450. In this case, the microinverter and the HMM are each equipped with transformer coils such that, when physically mated, form a communication and power transformer. The microinverter and HMM can exchange data over this transformer link. Further, the microinverter can provide power over this transformer, using known power conversion means. For example, PoE or "Power over Ethernet" techniques or other standards and methods may be employed to send both power and information over the same physical lines. In embodiments, SunPower's previously published patents provide such techniques for use within a microinverter wherein the main power transformer also doubles to exchange data between isolated circuits, using frequency and pulse width modulation (see, U.S. Pat. No. 8,634,216), which is incorporated by reference. Other techniques, seen in electric vehicle chargers and wireless power transfer means, may also be employed.

Other options for electromagnetic coupling may be employed in embodiments as well. Near-field communications (NFC) techniques may be employed. For example, RFID tags, which involve transmitting both power and information to a receiving device, may be employed. The coupling may be optical as well, such as by using infrared LEDs and receivers, in embodiments.

In embodiments, an HMM may preferably be equipped with some electrical energy storage, e.g., a capacitor or rechargeable battery. A storage device may provide supplementation to intermittent power derived from an attached PV panel. These storage devices are preferably positioned in embodiments such that they can be easily serviced upon expiration of their operational lifetime. Embodiments may also employ microinverters configured such that they may be able to be powered off the AC grid in the absence of PV power. In this case, AC grid power may also be employed to power a coupled HMM.

Embodiments may also be employed in PV systems where each branch circuit is equipped to couple to a 20-A circuit breaker in a main service panel or subpanel as well as PV systems where connection to the power grid may be accomplished via a meter collar such that the main panel can be bypassed. Embodiments may employ numerous meter collar sizes. Available off-the-shelf meter units offer different breaker sizes, including 40-A and 60-A. A 20-A breaker supports 3840 W of AC power rating, whereas 40-A and 60-A sizes support 7680 W and 11.52 kW, respectively. The vast majority of homes will likely not support an array large enough to justify a larger system than 60 A.

In embodiments, the meter collar link may demand using larger wires on the microinverters to support direct connection of the AC module branch circuits to the collar. In that respect, a 40-A branch cable with a 40-A meter collar can provide up to 7.68 kW of AC power on a single branch circuit. Consequently, a single-branch design would support a very significant majority of residential installations (likewise for larger sizes). FIG. 3 is illustrative of such a single branch design.

Embodiments may also employ a meter collar with multiple inputs, such as 2× or 3× 20-A inputs. In these embodiments, an installer may bring the meter collar to the installation site with the appropriate number of 20-A inputs (or whatever the branch current rating may be) and employ this connection topology in embodiments.

For systems requiring multiple branch circuits, one could still use a single gateway-enabled AC module as shown in FIG. 3. If the HMM-to-HMM communications is done with PLC, however, the challenge will be that modules on the branches not having the gateway will have a wire intervening between those modules and the gateway. In other words, such a system may be more susceptible to noise from the power line. In such a case, it may be preferred to equip the multiple-branch circuits with one gateway each.

In embodiments, for each HMM, there may be a cellular modem, with its own data and, therefore, data charges. Such charges may be normally structured based on a connectivity fee (minimum amount per cycle) and a component that scales with data usage. In these normal cases, the data per modem may each be limited to its own branch circuit, so the data charges scale with the number of AC modules, not the number of gateways. The connection charges do scale with the number of HMMs, but are but a portion of the total charges. As such, it may be most economical to equip multiple-branch circuits with multiple gateways. Indeed, for the HMM-enable module (microinverter), this would inherently limit the number of modules that the HMM would need to manage (itself plus, say, 11 others, for a 320-W(ac) microinverter on a 20-A circuit). For larger and larger arrays (like commercial arrays that may employ AC modules), it may be preferred to plan for multiple HMMs that do not necessarily require one per branch. These embodiments may employ one HMM per four branches, or whatever is optimal.

Figure 5:
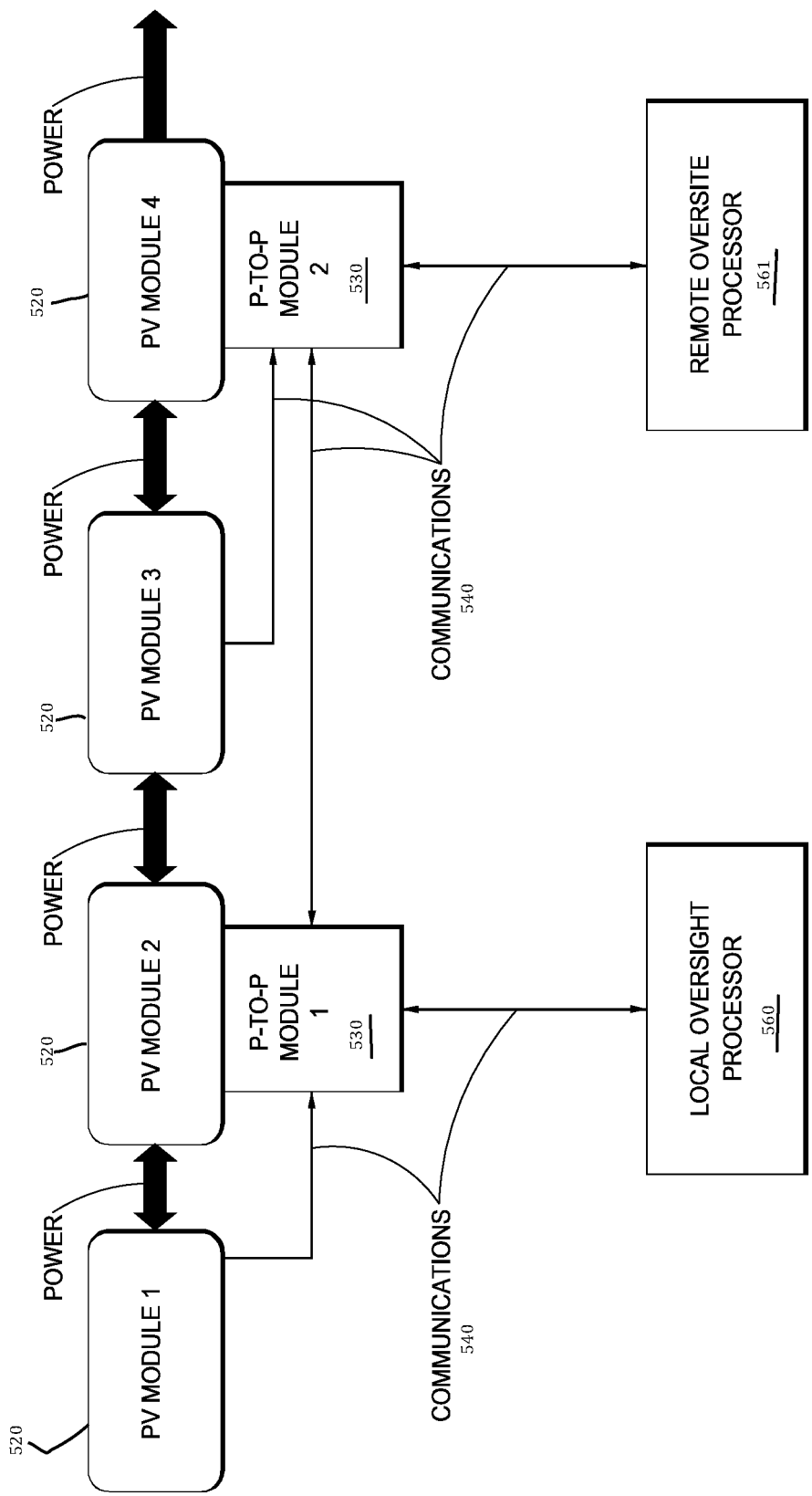
FIG. 5 illustrates PV system components, including peer-to-peer hybrid management modules, showing exemplary power flow and communication flow, according to some embodiments.

FIG. 5 shows a schematic of a PV system with multiple PV modules 520 as may be employed in embodiments. The PV modules 1-4 are shown transmitting power between them and to an external load. Two of the PV modules are connected to Peer-to-Peer modules 530. These peer-to-peer modules 530 may be considered a type of HMM as described herein. The P-to-P modules 530 may each have primary and secondary functionality for purposes of managing the operation and output of the PV system. The P-to-P modules may also perform communication operations 540 between outside systems and services and the PV system. This outside communication may be performed with cellular protocols rather than using a Wi-Fi protocol or short-range communication protocol. In embodiments, a short-range communication protocol may also be employed such that a single cellular hub may serve as a cellular communication hub for the PV system and may communicate with the P-to-P modules or other HMMs using a short-range communication protocol such as Bluetooth®.

In operation, the P-to-P modules 530 may work together to perform functions and services of an overall PV system manager. These functions and services can include monitoring operational states of each PV module and any microinverters or converters, managing operational states of each PV module and any microinverters or converters, and performing communication services among and between PV system components as well as among and between external systems such as local oversight processors 560 and remote oversight processors 561.

Figure 6:
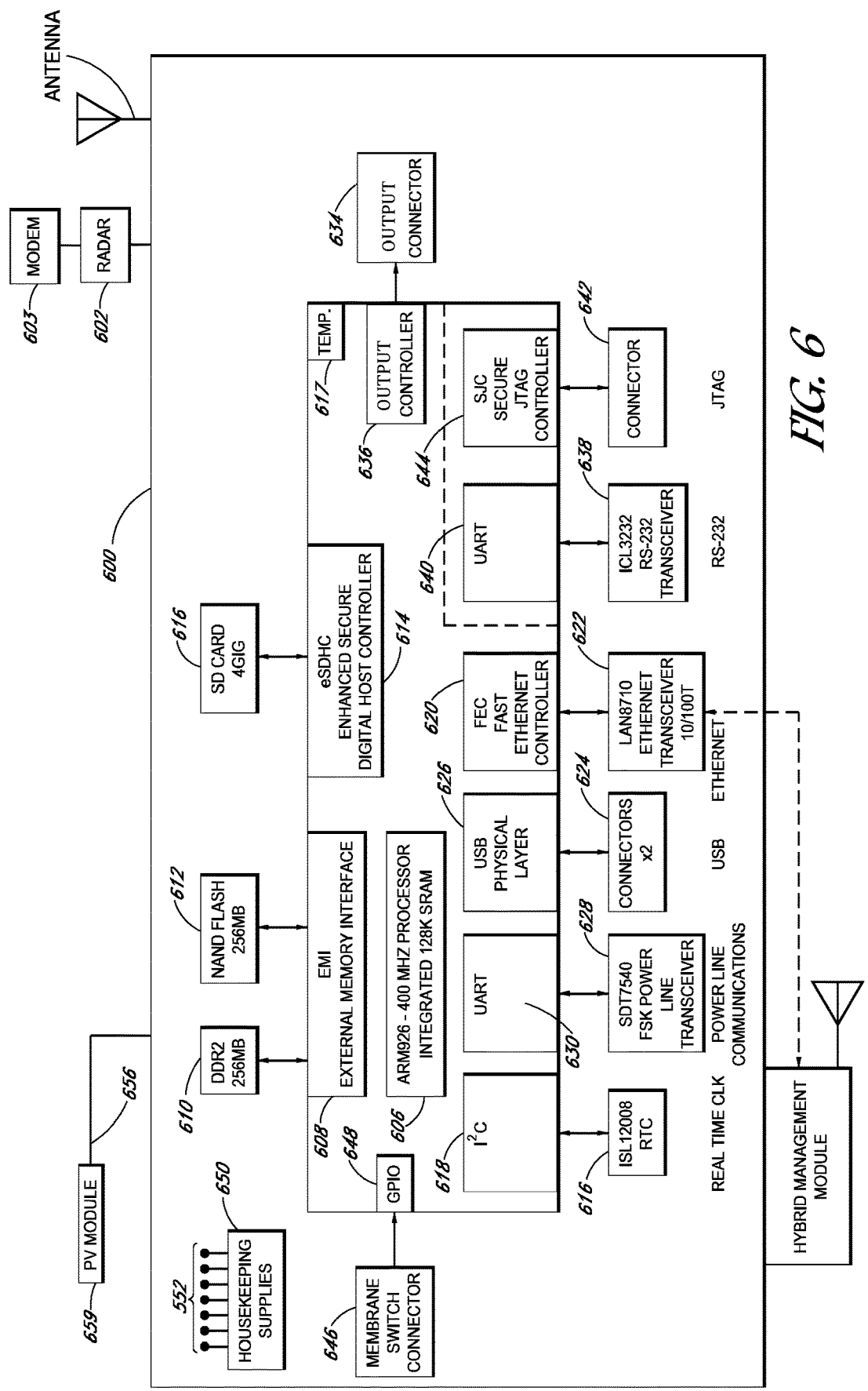
FIG. 6 illustrates microinverter sub-components and topology that may be monitored or managed by hybrid management module(s), according to some embodiments.

FIG. 6 depicts a block diagram of a gateway 600 and sub-components that may be in communication with an added HMM according to some embodiments. The arrangement shown in FIG. 6 is an example arrangement of a gateway, its relation in a PV system and its relationship to a coupled HMM. Other embodiments may implement different arrangements while providing the functionalities disclosed herein.

Gateway 600 with retro-fit HMM may serve as the communications hub of a PV solar array. Gateway 600 may continuously monitor the performance of the devices within a PV system. Communications between gateway 600 and associated HMM devices may take place over cellular pathways, short-range protocol pathways, and via PLC or other methodology. Thus, no additional data cabling may be needed, though data cabling, such as CAT5 or CAT6 cabling, may be used to connect gateway 600 with an HMM. Communications beyond the PV system on behalf of the PV system may be solely performed by the HMM, which is gathering data from the gateway 600 regarding the PV system.

Gateway 600 includes the following components that act as a single board computer to provide functionality disclosed herein. Gateway 600 includes a processor 606. Preferably, processor 806 is a 32 bit, 400 MHz advanced reduced instruction set computing (RISC) machine (ARM) processor, but it is not limited to these specifications. Alternatively, processor 606 may be a complex instruction set computing (CISC) processor. Processor 606 is capable of supporting a full operating system, such as LINUX™ or WINDOWS™.

Gateway 600 include an external memory interface 608 that helps processor 606 retrieve data, such as instructions or stored data, from dynamic RAM 610 and flash memory 612. Dynamic RAM 610 preferably is a double data rate (DDR) dynamic RAM and may have a memory size greater than 128 MB. Flash memory 812 may be greater than 128 MB as well, and, preferably, is a NAND type flash memory. Gateway 600 also may include an enhanced secure digital host controller 614 to read secure digital (SD) memory card 816. Preferably, SD memory card 616 has a capacity greater than 2 GB.

Gateway 600 includes a real-time clock 616 coupled to inter-integrated circuit 618. Inter-integrated circuit 618 may act as a single-ended, serial computer bus to attach peripherals to processor 606. Real time clock 616 may have a super cap backup with about a week or more duration. Gateway 600 also includes a temperature sensor 617. Preferably, gateway 600 has a nominal power consumption of less than 2 watts, or even less than 1 watt.

PLC communications may occur through power line transceiver 628. PLC communication may be accessible through the power cord. Power line transceiver 628 may be coupled to universal asynchronous receiver/transmitter 630. Gateway 600 may implement a ½ duplex, synchronous communication mode for PLC communications. Power line transceiver 628 may implement a frequency shift key (FSK) modulation with a carrier of 110 KHz. Cellular communications may be provided through the antenna.

Gateway 600 may also include an optional output connector 634. Output connector 634, in some embodiments, may be a wired network interface port using a standard connection configuration and may communicate through output controller 636 for onsite maintenance, for system configuration, and for other reasons as well. Connector 634 may connect to the logic of gateway 600 using controller 636. Processor 606 may instruct the data or other information be transmitted or received in response to commands or other signals sent through the connector 634 as well as the antenna, modem, and radar. Thus, onsite activities may be conducted through a physical hookup to the connector 634 via the controller 636.

RS-232 transceiver 638 may be used for serial communication transmission of data to and from gateway 600. RS-232 transceiver 638 may connect to serial port 640, which may be a universal asynchronous receiver/transmitter port, as well as to the antenna. Gateway 600 also includes a joint test action group (JTAG) connector 642 coupled to a secure JTAG controller 644. The JTAG configuration may be used as a debug port implementing a serial communications interface. These debug service, like other functionality, as functionality for other HMMs and components of the PV system.

Membrane switch connector 646 is coupled to gateway 600 via a general-purpose input/output (GPIO) pin 648. These components may serve as an additional digital control line for gateway 600.

Housekeeping power supply 650 may provide power for the various components within gateway 600. Housekeeping power supply 650 includes circuitry to convert input power from either an AC voltage or a DC voltage into values appropriate for the items disclosed above. The housekeeping output voltages may be supplied to the components via housekeeping supply rails 652. Each rail may provide a different voltage depending on the specifications for the components.

For example, one housekeeping supply rail 652 may provide a 12-volt switched voltage for PLC communications components. Another housekeeping supply rail 652 may provide 5 volts for the USB connectors 624. A housekeeping supply rail 652 may provide 3.3 volts for processor 606, and the flash, Ethernet and SD components. A housekeeping supply rail 652 also may provide 1.8 volts for the DDR components. Other voltages may include 1.5 volts, 1.45 volts and −1.3 volts, and any other voltages needed to operate gateway 600.

Gateway 600 may be connected to a PV system having multiple PV modules. Gateway 600 may communicate through a network via the HMM. IP data may be sent over a cellular network using a modem 603 and antenna. Communications from gateway 600 to the PV modules may occur over PLC communication lines 656 as well as using wireless or cellular methodologies. As disclosed above, the disclosed embodiments may implement a PLC communications protocol or wireless or cellular protocol to facilitate these communications. The Ethernet port 622 may be used during start up or for on-site troubleshooting but this Ethernet port, if present, will preferably not be employed for internal and external PV system communications as cellular, wireless, and PLC communications are preferred for ongoing HMM operation and PV system operation and management.

As noted above, other versions of the Gateway 600 may be employed. For example, simplified versions may employ fewer components than shown in Gateway 600 and provide reduced processing functionality where a processor is configured to aggregate data from one or more PV modules and then communicate this data via a wireless transmission. Available memory may also be reduced in simplified versions of the gateway 600. Firmware updates, power grid upgrades, and other incoming data transfers may also be carried out by gateways 600 having full or simplified component configurations in certain embodiments. Through reduced functionality power consumption as well as costs attributable to fewer components may each be reduced.

Figure 7:
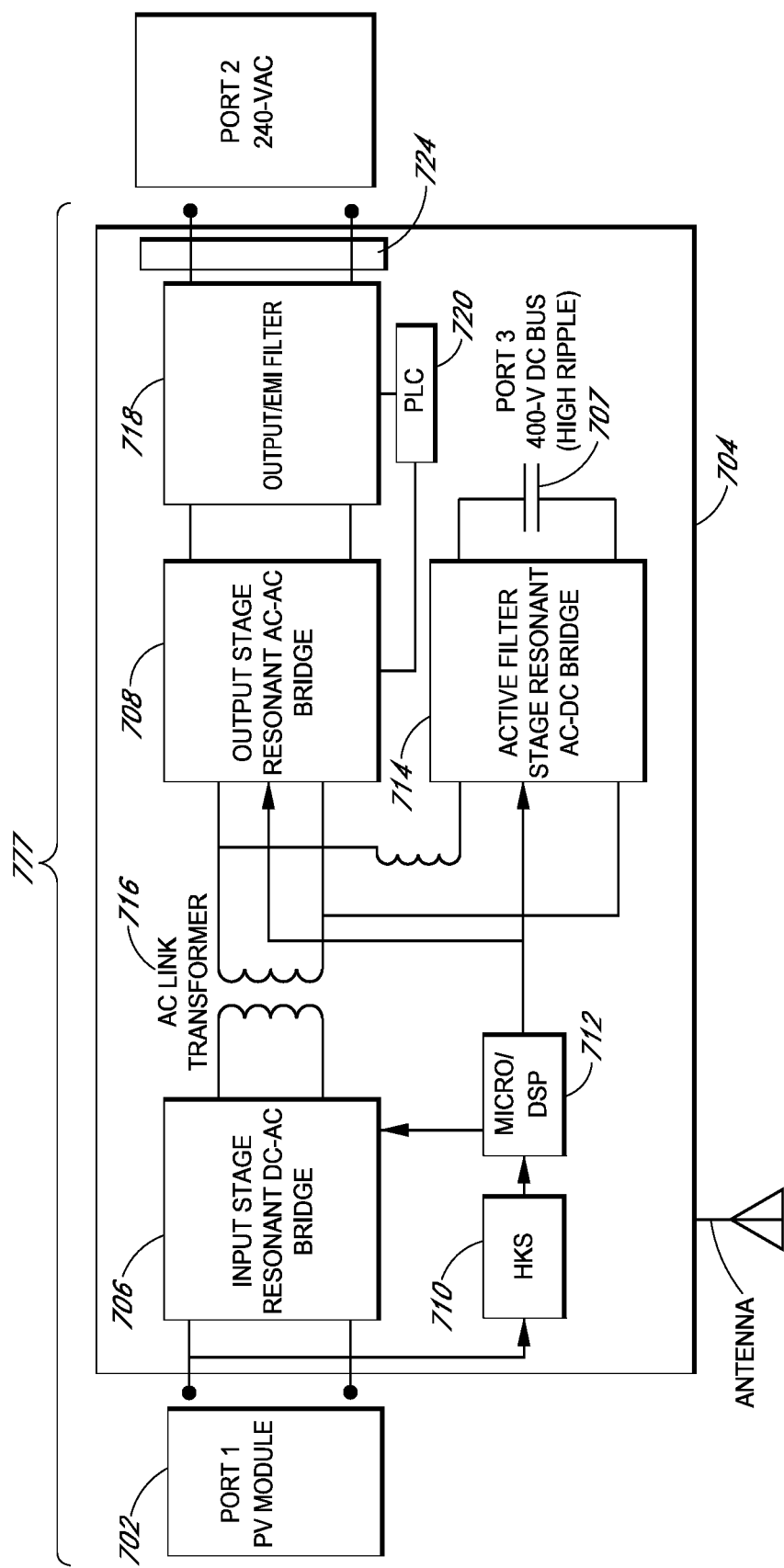
FIG. 7 illustrates microinverter sub-components and topology that may be monitored or managed by hybrid management module(s), according to some embodiments.

FIG. 7 depicts a branch circuit 706 connected to a PV module and microinverter according to some embodiments. The components shown in FIG. 7 are an exemplary topology. Other topologies may be used for branch circuits 706, including those with different components. One or more HMMs may manage or monitor one or more of the circuits or functions of the microinverter 704. Microinverter 704 is coupled to a PV module. PV module may be a solar panel that collects solar energy and converts it into power. Preferably, the power is DC power. The power is received by input stage 706, which also may be known as a boost stage. Preferably, input stage 706 may be a resonant DC-DC bridge circuit. Input stage 706 may convert the received power to a high voltage, with electrical/transformer isolation provided by AC transformer 716. Input stage 706 also may conduct maximum power point tracking (MPPT). In some embodiments, input stage 706 may provide the converted voltage to a high voltage DC bus 707 or to an active filter stage 714. In yet further embodiments, high voltage DC bus 707 may be a 400-volt DC bus. High voltage DC bus 707 may be known as a high ripple bus.

Output stage 708 converts the high voltage to a grid compatible AC current that is output through a cable. The high voltage may be on high voltage bus 707. Output stage 708 also is coupled to AC transformer 716. Output stage 708 may be a resonant AC-AC bridge circuit. Output stage 708 also may be coupled to filter 718, which receives the output current to reduce electrical distortion. Filter 718 may include passive components, such as inductors and capacitors, to reduce the distortion. The distortion may be in the form of low frequency harmonics or high frequency interference.

Microinverter 704 also includes housekeeping power supply (HKPS) 710 to provide stable voltage to logic and circuitry within the microinverter. More than one HKPS 710 may be implemented. Each HKPS 710 may have more than one output voltage. In some embodiments, microinverter 704 may not include a HKPS 710 at all, and, instead, receives power from PV supervisor over cable. HKPS 710 also should be able to operate from a relatively high voltage from the panel voltage or the high voltage bus 707 but regulate down to as little as 1 volt or less.

Microcontroller/digital signal processing circuit (Micro/DSP) 712 may conduct most or all of the control functions for microinverter 704. Such functions may include dynamic regulation of signals and regulatory functions. Micro/DSP 712 may receive power from HKPS 710. In the absence of a HKPS 710, then micro/DSP 712 may receive power from PV supervisor 708.

An active filter stage 714 may be coupled to output stage 708. Active filter stage 714 serves to decouple the high voltage capacitor 707 from other voltages in the microinverter 204. Active filter stage 714 may include a resonant AC-DC bridge circuit and may receive information and instructions from micro/DSP 712.

Powerline carrier (PLC) circuit 720 may include circuits dedicated to providing communications to and from HMMs. PLC circuit 720, therefore, may be a communication circuit for microinverter 704.

Microinverter 704 also may include a surge suppressor 724. Surge suppressor 724 may be coupled to output filter 718. In some embodiments, surge suppressor 724 may be partially embedded in filter 718. Surge suppressor 724 includes circuitry to protect against high voltage surges on the AC line. Surge suppressor 724 may provide surge protection that causes microinverter 704 to survive thousands of voltages in excess of normal line voltage. The circuitry of surge suppressor 724 may comprise metal-oxide varistors (MOVs).

Figure 8:
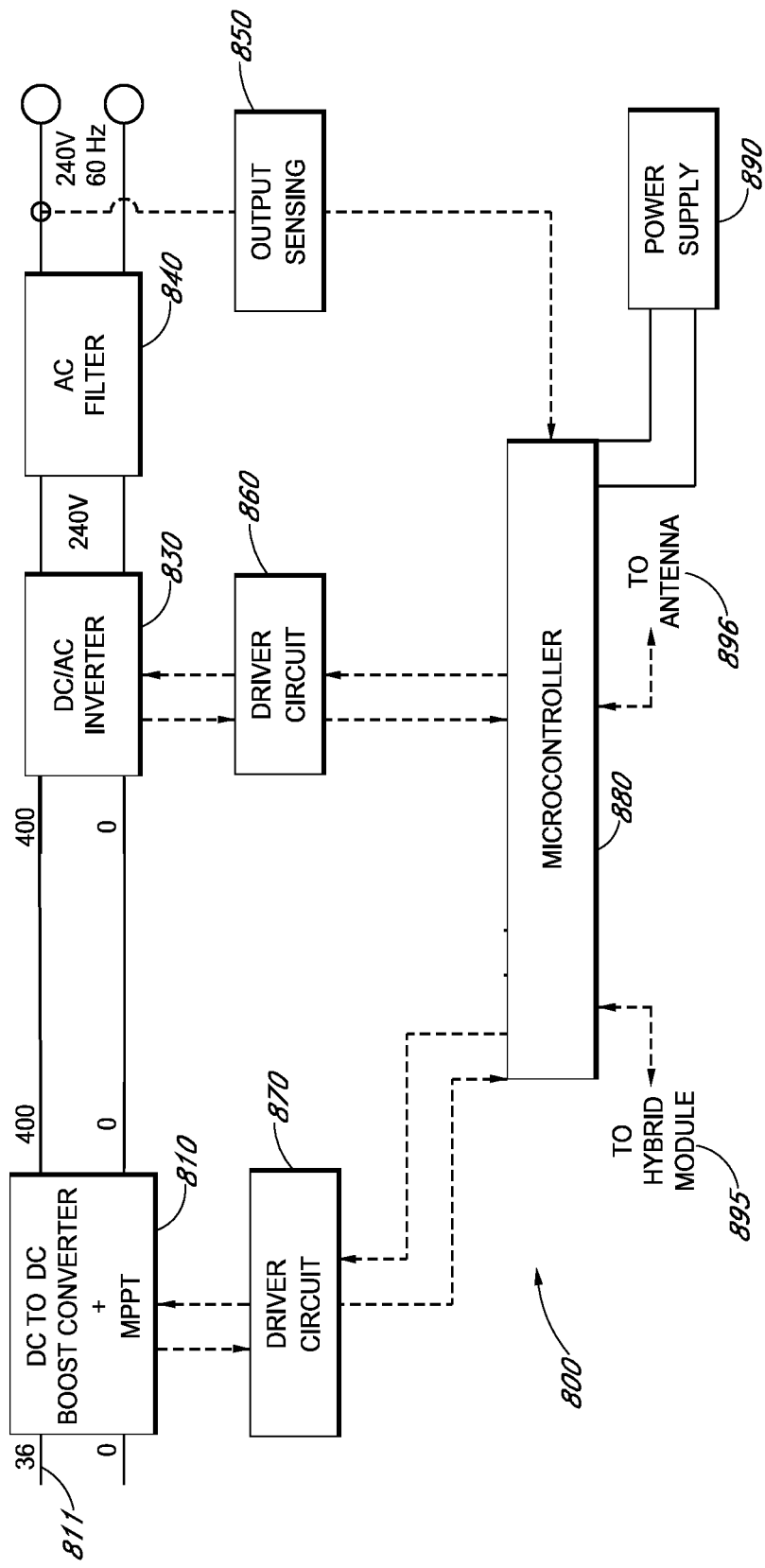
FIG. 8 illustrates microinverter sub-components and topology that may be monitored or managed by hybrid management module(s), according to some embodiments.

Turning now to FIG. 8, a block diagram of an inverter as may be coupled to a hybrid management module is provided. One or more HMMs may manage or monitor one or more of the circuits or functions of the block diagram of FIG. 8. Labeled in FIG. 8 are a boost converter 810, which may optionally contain an isolation transformer, an inverter 830, an output filter 840, driver circuit 870, driver circuit 860, output sensor 850, microcontroller 830, and power supply 890. Communications are designated by dashed lines while power exchange is designated with solid lines with the isolation transformer also being dashed because it may be optional.

In operation, a DC source may provide a DC voltage input 811 to the inverter 800. This input voltage 811 may be stepped up in voltage by a boost converter 810 or may be passed directly to the inverter 830 before reaching the inverter 830. The inverter 830 may contain a topology with pairs of switches such that when the switches are fired in an alternating order, input DC voltage is converted to a cyclical AC output voltage. This AC output voltage may be further conditioned in AC filter 840. As can be seen, the inverter serves to change the DC input voltage of 400 volts to a mean AC voltage of 240 volts. These voltages may be different in different embodiments, as may the topology of the inverter 800 itself.

In embodiments, when a microcontroller 880 or other controller, determines that additional input voltage is being provided, that an inverter is not operating in a peak range, that another inverter has been added to the system, and for various other reasons, including those described herein, the microcontroller 880 or other controller may modify the functionality of the inverter 800 and may also send control signals to other inverters in the system via HMMs. Thus, the microcontroller or other controller may serve as a local controller for the inverter 800 and with the assistance of a an HMM for the system as a whole. Communications to and from hybrid management module is shown at 895 and to and from antenna is shown at 896. In embodiments, the microcontroller 880 may be configured with management functionality and may also communicate back and forth to an HMM for additional services or for quality checks of redundancy purposes. The antenna is shown communicating back and forth with microcontroller 880 however this antenna may communicate back and forth with an HMM instead. In embodiments, an antenna coupled to an HMM, later added to an inverter, such as the inverter 800, may include an antenna and provide cellular communication services as well as firmware updates for the inverter 800. In so doing, an already installed inverter 800 may be retrofitted in the field with the addition of an HMM and previously installed master controllers, located at or beyond a main service panel may be removed or otherwise deactivated. Multiple HMMs may be installed in a field of inverters such that the inverters act as a peer-to-peer network with capabilities of diagnostics and management of the PV system and for purposes of one or more of the HMMs using cellular communication techniques and protocols to send and receive.

As shown in FIG. 4 mechanical couplings may be employed to secure an HMM to a microinverter or another component. These can include male and female couplings on the HMM and microinverter or other component as well as having the HMM configured to secure to a microinverter or nearby PV module during a retro-fit of an existing PV module and microinverter.

This description has proposed system architecture that may significantly reduce the installed hardware cost. In the best case, there is no global system manager or subpanel to install and AC module branch circuits route directly to a meter collar. All site-to-internet communications may preferably be handled via cellular (or whatever future wireless protocol) data. The added cost of cellular data may be more than offset by the hardware savings and advantages of bypassing homeowner internet service.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Each of the above exemplary embodiments were given in terms of US power grid codes and standards. Similar analysis would apply for non-US power grids having different power, voltage, and current ratings.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A peer-to-peer photovoltaic management module comprising:
    a processor having instructions and protocols for communicating via a cellular network;
    an antenna and antenna circuitry configured to communicate over a cellular network; and
    a storage device configured to store instructions to be run by the processor, the instructions, when executed, causing the processor to:
    monitor power output of a first PV module in a first PV module system;
    exchange communications via a cellular network and the antenna circuitry, regarding the operational status of a second PV module in the first PV module system; and
    exchange communications, via a cellular network and the antenna circuitry, with a management server positioned more than 1 km from the processor,
    wherein the processor, storage device and antenna, are configured to be coupled to at least one of a portion of a microinverter,
    wherein the storage device is further configured to store instructions to be run by the processor, the instructions, when executed, causing the processor to communicate amongst other peer-to-peer photovoltaic management modules in a first PV system to identify the strongest available cellular signal available amongst the other peer-to-peer photovoltaic management modules of the first PV system, the first PV system providing output electrical power from a plurality of PV modules of the first PV system to a shared main service panel.

2. The peer-to-peer photovoltaic management module of claim 1 wherein the processor, storage device and antenna are configured to be removably coupled to at least one of a portion of a photovoltaic module or a microinverter.

3. The peer-to-peer photovoltaic management module of claim 2 further comprising mechanical coupling comprising a snap or a hook or a latch or a magnet or adhesive or hook and loop fasteners or wire.

4. The peer-to-peer photovoltaic management module of claim 1 wherein the processor, storage device and antenna are electrically coupled to a microinverter via a transformer winding.

5. The peer-to-peer photovoltaic management module of claim 1 wherein the processor, storage device and antenna are:
(a) electrically coupled to at least one of a portion of a photovoltaic module via a transformer winding or a portion of a microinverter via a transformer winding and,
(b) mechanically coupled to at least one of a portion of a photovoltaic module via mechanical coupling or a portion of a microinverter via mechanical coupling.

6. The peer-to-peer photovoltaic management module of claim 1 wherein the processor is configured to exchange communications with an identical processor located at the second PV module.

7. The peer-to-peer photovoltaic management module of claim 1 wherein the processor, storage device and antenna are positioned upstream of a main service panel, the main service panel receiving alternating voltage from a group of PV modules in the first PV module system, the group of PV modules including the first PV module.

8. The peer-to-peer photovoltaic management module of claim 1 wherein the storage device is further configured to store instructions to be run by the processor, the instructions, when executed, causing the processor to:
exchange communications, via a cellular network and the antenna circuitry, regarding the operational status of a second PV module in the first PV module system, with the second PV module solely using the cellular network and the antenna circuitry.

9. A photovoltaic system comprising:
a first peer-to-peer management module; and
a second peer-to-peer management module,
wherein both the first peer-to-peer management module and the second peer-to-peer management module comprise:
a connector configured for connection to a microinverter coupled to a PV module,
an antenna and antenna circuitry configured to provide communications between the first peer-to-peer management module and the second peer-to-peer management module via a cellular network using a cellular network protocol,
circuitry configured to manage operation of one or more PV modules of a photovoltaic system of which the first and second peer-to-peer management modules are a part,
wherein the circuitry is further configured to identify the strongest available cellular signal available amongst the first peer-to-peer management module and the second peer-to-peer management module.

10. The photovoltaic system of claim 9 wherein the first peer-to-peer management module and the second peer-to-peer management module are configured to be removably coupled to at least one of a portion of a PV module or a microinverter.

11. The photovoltaic system of claim 9 wherein the first peer-to-peer management module and the second peer-to-peer management module are electrically coupled to a microinverter via a transformer winding.

12. The photovoltaic system of claim 9 wherein the first peer-to-peer management module and the second peer-to-peer management module are (a) electrically coupled to a microinverter via a transformer winding and (b) mechanically coupled to at least one of a portion of a photovoltaic module or a microinverter via mechanical coupling.

13. The photovoltaic system of claim 12 wherein the mechanical coupling comprises a snap or a hook or a latch or a magnet or adhesive or hook and loop fasteners or wire.

14. The peer-to-peer photovoltaic management module of claim 9 wherein the first peer-to-peer management module is configured to solely exchange communications with the second peer-to-peer management module via a cellular network protocol.

15. The photovoltaic system of claim 9 wherein the first peer-to-peer management module and the second peer-to-peer management module are positioned upstream of a main service panel, the main service panel receiving alternating voltage from a group of PV modules, the group of PV modules including the first peer-to-peer management module.

16. A method of installing a photovoltaic system comprising:
installing a plurality of peer-to-peer management modules on a plurality of PV modules of a photovoltaic system,
wherein each of the peer-to-peer management modules are positioned upstream of a main service panel of the photovoltaic system,
wherein each of the peer-to-peer management modules are configured to exchange photovoltaic operational data to at least one other peer-to-peer management module,
wherein each of the peer-to-peer management modules is coupled to a microinverter,
wherein at least one of the peer-to-peer management modules is configured to serve as a central service manager for the photovoltaic system,
wherein at least two of the peer-to-peer management modules are configured to communicate operational data of the photovoltaic system with each other solely using a cellular network and cellular network communication protocols;
wherein at least one of the peer-to-peer management modules is configured to identify the strongest available cellular signal available amongst each of the peer-to-peer management modules, and
confirming operation of one or more of the peer-to-peer management modules after installing the plurality of peer-to-peer management modules.

17. The method of installing a photovoltaic system of claim 16 wherein each of the peer-to-peer management modules has a mechanical coupling, the mechanical coupling configured to mate with a portion of a PV module from the plurality of PV modules.

18. The method of installing a photovoltaic system of claim 16 wherein the peer-to-peer management modules are cumulatively configured to operate without the need of a system wide central service manager electrically coupled to the photovoltaic system, the system wide central service manager having a circuit topology different than the peer-to-peer management modules.

19. The method of installing a photovoltaic system of claim 16 wherein each of the peer-to-peer management modules share identical circuit topologies.

\* \* \* \* \*